(12) United States Patent
Imai

(10) Patent No.: US 9,207,856 B2
(45) Date of Patent: Dec. 8, 2015

(54) VEHICULA TOUCH INPUT DEVICE WITH DETERMINATION OF STRAIGHT LINE GESTURE

(71) Applicant: NIPPON SEIKI CO., LTD., Nagaoka, Niigata (JP)

(72) Inventor: Yuji Imai, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 14/359,510

(22) PCT Filed: Nov. 9, 2012

(86) PCT No.: PCT/JP2012/079122
§ 371 (c)(1),
(2) Date: May 20, 2014

(87) PCT Pub. No.: WO2013/080774
PCT Pub. Date: Jun. 6, 2013

(65) Prior Publication Data
US 2014/0292652 A1    Oct. 2, 2014

(30) Foreign Application Priority Data

Nov. 29, 2011 (JP) ................................ 2011-260830

(51) Int. Cl.
*G06F 3/041* (2006.01)
*G06F 3/0488* (2013.01)
(Continued)

(52) U.S. Cl.
CPC ............ *G06F 3/0488* (2013.01); *B60R 16/027* (2013.01); *G06F 3/041* (2013.01); *B60K 2350/928* (2013.01); *B60R 16/023* (2013.01)

(58) Field of Classification Search
CPC .................. G06F 3/041–3/047; G06F 3/0488;
G06F 3/04883; G06F 3/04886; B60K 2350/928; B60K 2350/1024; B60K 2350/1028; B60K 2350/1032
See application file for complete search history.

(56) References Cited

U.S. PATENT DOCUMENTS 5,457,476 A * 10/1995 Jenson .......................... 715/823
5,564,005 A * 10/1996 Weber ................. G06F 3/04883
715/863
5,592,608 A     1/1997 Weber et al.
(Continued)

FOREIGN PATENT DOCUMENTS

JP      10-214152 A     8/1998
JP   2009-298285 A    12/2009
JP    2013-12021 A     1/2013

OTHER PUBLICATIONS

International Search Report issued in Application No. PCT/JP2012/079122 dated Feb. 5, 2013.

*Primary Examiner* — Gene W Lee
(74) *Attorney, Agent, or Firm* — McDermott Will & Emery LLP

(57) ABSTRACT

A vehicle operating device with favorable operability is provided, the operating device having improved recognition accuracy of gestural operation conducted while holding a steering wheel.
A vehicle operating device comprises an input unit that is provided on a steering wheel and that detects a user operation; and a control unit that determines the user operation detected by the input unit and that outputs a control signal for controlling a device; wherein, the control unit determines that the user operation is linear when a locus (L) of the user operation does not exceed a certain width (W).
1 unit operates the air-conditioner body based on the preset temperature.

4 Claims, 7 Drawing Sheets

(51) Int. Cl.
 *B60R 16/027* (2006.01)
 *B60R 16/023* (2006.01)

(56) References Cited

U.S. PATENT DOCUMENTS

| | | | |
|---|---|---|---|
| 2003/0210286 A1 | 11/2003 | Gerpheide et al. | |
| 2004/0195031 A1* | 10/2004 | Nagasaka | B60K 35/00 180/271 |
| 2005/0003851 A1* | 1/2005 | Chrysochoos | G06F 3/04883 455/550.1 |
| 2008/0143686 A1* | 6/2008 | Yeh | B60K 37/06 345/173 |
| 2010/0188343 A1* | 7/2010 | Bach | B60K 37/06 345/173 |
| 2011/0169750 A1* | 7/2011 | Pivonka et al. | 345/173 |
| 2011/0173530 A1* | 7/2011 | Winternitz | G06F 3/04883 715/243 |
| 2011/0302532 A1* | 12/2011 | Missig | 715/823 |
| 2012/0216141 A1* | 8/2012 | Li | G06K 9/00416 715/780 |
| 2012/0304107 A1* | 11/2012 | Nan | G06F 3/04886 715/781 |
| 2013/0063380 A1* | 3/2013 | Wang | G06F 3/04883 345/173 |
| 2013/0219343 A1* | 8/2013 | Nan | G06F 3/0486 715/838 |
| 2014/0304636 A1* | 10/2014 | Boelter | G06F 3/04883 715/771 |

\* cited by examiner

VEHICULA TOUCH INPUT DEVICE WITH DETERMINATION OF STRAIGHT LINE GESTURE

CROSS-REFERENCE TO RELATED APPLICATIONS

The present application is the U.S. National Phase of PCT/JP2012/079122 dated Nov. 9, 2012 which claims priority from Japanese Patent Application No. 2011-260830 filed Nov. 29, 2011; the subject matter of each is incorporated herein by reference in entirety.

TECHNICAL FIELD

The present invention relates to a vehicle operation device, and in particular to a vehicle operation device provided on a steering wheel.

BACKGROUND ART

Conventionally, a vehicle operation device comprises a touch pad composed of a plurality of touch sensors arranged in a spork part of a steering wheel, a detection unit, a determination unit, and a control unit. The determination unit selects an operation entered based on a combination of gestures detected by the touch pad. The control unit controls a device such as a car navigation device based on a selected operation (See Patent Literature 1).

CITATION LIST

Patent Literature

Patent Literature 1: Japanese Unexamined Patent Application Publication No. 2009-298285

SUMMARY OF THE INVENTION

Problems to be Solved by the Invention

In a conventional a vehicle operation device, when moving up or down a menu item displayed on a screen of a car navigation device, for example, it is necessary to make a gesture to draw a linear locus in a vertical direction on the touch pad.

However, when a gesture is made with a thumb to draw a liner locus in a vertical direction while holding a steering wheel, the gesture makes an arc locus around a base of a thumb, the gesture detected by the detection unit is not necessarily a straight line, and the gesture may be erroneously detected or the detection may fail. As a result, the gesture has to be repeated or the operation has to be done while visually recognizing the touch pad. This arises a problem of unfavorable operability.

Accordingly, it is an object of the invention to provide a vehicle operation device, which solves the above problem, improves recognition and accuracy of a gesture operation made while holding a steering wheel, and provides favorable operability.

Means for Solving the Problem

A present invention, in order to solve the above problems, a vehicle operation device comprising an input unit, which is provided on a steering wheel, and configured to detect a user operation, and a control unit, which determines the user operation detected by the input unit, and outputs a control signal to control a device, wherein the control unit determines the user operation as a straight line when a locus of the user operation meets with a predetermined condition.

Further, the present invention, the predetermined condition is that a locus of the user operation does not exceed a predetermined width.

Further, the present invention, the predetermined width is composed of left and right side widths horizontal to a vertical direction of the input unit passing through a start point of the user operation.

Further, the present invention, the predetermined width is composed of upper and lower side widths perpendicular to a horizontal direction of the input unit passing through a start point of the user operation.

Further, the present invention, the input unit is provided on a right side of the steering wheel, and the predetermined width is such that a left side width is wider than a right side width in a lateral width horizontal to a vertical direction of the input unit passing through a start point of the user operation.

Further, the present invention, the input unit is provided on a left side of the steering wheel, and the predetermined width is such that a right side width is wider than a left side width in a lateral width horizontal to a vertical direction of the input unit passing through a start point of the user operation.

Further, the present invention, the predetermined width is such that an upper side width is wider than a lower side width in a vertical width perpendicular to a horizontal direction of the input unit passing through a start point of the user operation.

Further, the present invention, an arc design within the predetermined width is provided in the input unit.

Further, the present invention, the arc design is provided so that its longitudinal direction is along a vertical direction of the input unit.

Further, the present invention, the arc design is provided so that its longitudinal direction is along a horizontal direction of the input unit.

Further, the present invention, the predetermined condition is that a locus of the user operation is larger than a predetermined rotation radius.

Further, the present invention, a locus connecting a start point and a final contact point of the user operation is larger than a predetermined rotation radius.

Further, the present invention, the control unit recognizes the start point as a position of just before a predetermined time from a final contact point of the user operation.

Effect of the Invention

According to the invention, it is possible to provide a vehicle operation device, which is configured to achieve a desired object, increase recognition accuracy of gesture operation made while holding a steering wheel, and improve operability.

MODES FOR CARRYING OUT THE INVENTION

Hereinafter, an embodiment of the present invention will be described with reference to the drawings.

Figure 1:
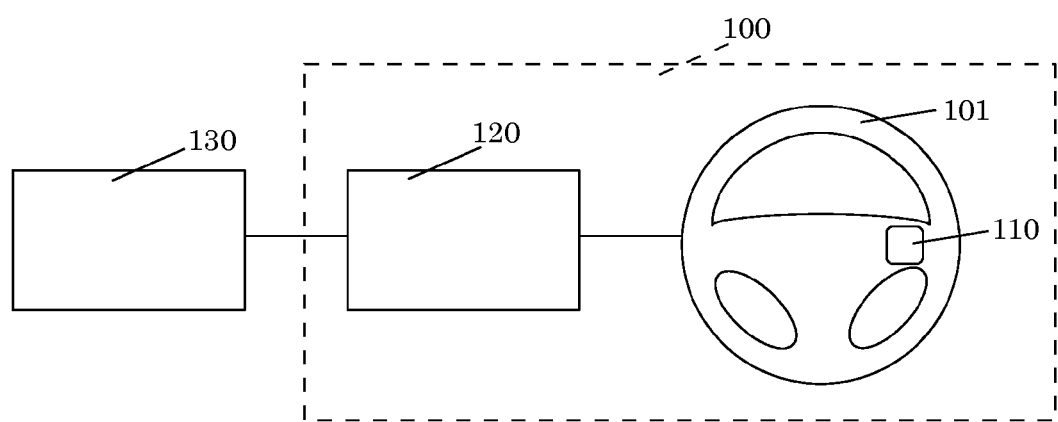
FIG. 1 is a block diagram showing an electric configuration of a vehicle operation device according to an embodiment of the invention.

In FIG. 1, a vehicle operation device 100 of the embodiment primarily comprises an input unit 110, and a control unit 120. A reference numeral 130 denotes a device to be operated by the vehicle operation device 100.

The device 130 is connected to the vehicle operation device 100, and its operation and setting contents are controlled in accordance with operation of the input unit 110. In the embodiment, the device 130 is explained as an example of car navigation device. The device 130 is not limited to a car navigation device, but may be audio equipment or the like. The device 130 is not limited to one set, but may be two or more sets.

The input unit 110 is an electrostatic capacity type touch pad, for example. In the input unit 110, a plurality of sensors is arranged in horizontal and vertical directions, and a sensor value of the input unit 110 is changed by touching the surface of the input unit 110 with a finger U or the like. The input unit 110 is configured to detect a position or motion of the finger U as a gesture operation, convert a sensor value detected by the input unit 110 into an operation input signal, and output the signal to the control unit 120.

In the embodiment, the input unit 110 is provided only on the right side of the steering wheel 101 held by a user who sat in a driver's seat of a vehicle.

The control unit 120 comprises a computer composed of a CPU, a ROM, a RAM, and an input/output interface or the like. In the embodiment, the control unit 120 is mounted on a circuit board provided in the vehicle operation device 100, and is configured to input the operation input signal of the input unit 110 and detect coordinate values (x, y) of the finger U on the input unit 110. The ROM as a nonvolatile memory stores a gesture operation table data provided with a plurality of gesture operations in each corresponding a plurality of control signals to operating the device 130.

Figure 2:
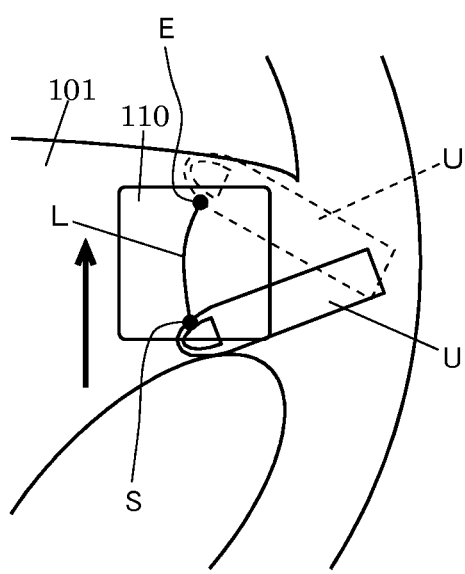
FIG. 2 is a diagram showing a gesture in the same embodiment.
Figure 3:
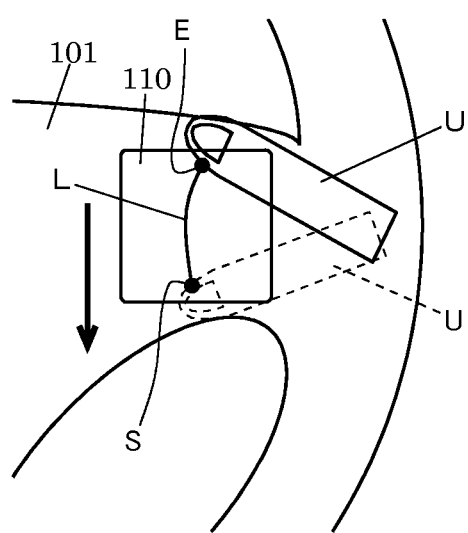
FIG. 3 is a diagram showing another gesture in the same embodiment.

The control unit 120 recognizes a gesture operation such as a slide and a flick (a swing-like touch) in a vertical direction as shown in FIG. 2 and FIG. 3 by using coordinate values of the finger U on the input unit 110. The control unit 120 compares the recognized gesture operation with the gesture operation table data, and sends a control signal corresponding to a relevant gesture operation to the device 130, and controls the device 130.

Figure 7:
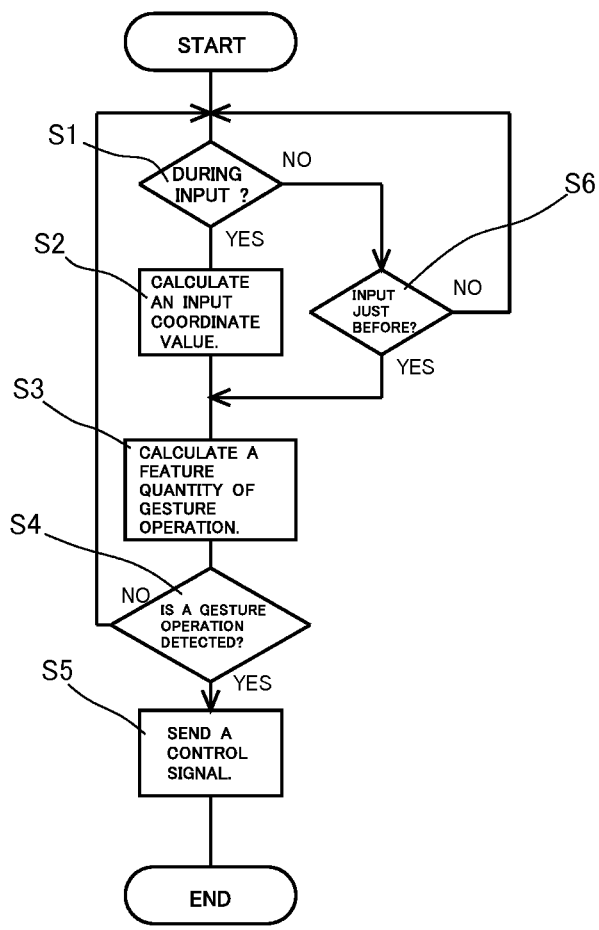
FIG. 7 is a flowchart showing processing of a control unit of the same embodiment.

Next, operation of the vehicle operation device 100 in the embodiment will be explained with reference to FIG. 7.

When a user finger U touches the input unit 110, it is determined to be an input in step S1 that determines an input in the input unit 110, and the process goes to step S2.

When the user finger U does not touch the input unit 110, the process goes to step S6 from step S1, and step S6 is executed to determine whether there has been an input in the input unit 110 until just before (e.g., before 10 milliseconds). When the user has input in the input unit 110 until just before, the process goes to step S3 (calculate a feature quantity of gesture). When the user has not input in the input unit 110 until just before, the process returns to step S1.

In step S2, current coordinates (a final contact point) touched by the user per predetermined unit time are calculated, and past coordinates of predetermined time are held.

In step S3, a feature quantity of gesture operation is calculated. Using the current coordinates (a final contact point) and past coordinates, a moving distance of the user finger U, a moving direction of the user finger U, time (moving time) from touching to removal of the user finger U, a rotation radius of the finger U around predetermined coordinates, and a rotation angle of the finger U around predetermined coordinates are calculated. Further, a feature quantity of gesture operation is calculated by using the moving distance, moving direction, time (moving time), rotation radius, and rotation angle.

In the vehicle operation device 100 of the embodiment, when a locus L connecting a start point S of user operation and an end point E as a final contact point does not exceed a predetermined width W, the control unit 120 determines a user's gesture operation to be a straight line. In this case, a final contact point is the end point E that the user operation has been completed. A final contact point is not limited to the point that the user operation has been completed, but may be a latest point in user operation.

Figure 4:
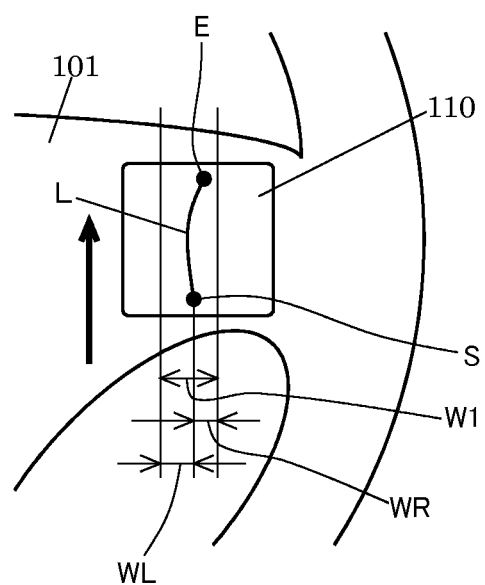
FIG. 4 is an explanatory diagram showing a predetermined width to be recognized as a straight line.

As shown in FIG. 4, in a predetermined width W, a lateral width W1 in a lateral direction of the input unit 110 is composed of left and right side widths WL and WR horizontal to a vertical direction of the input unit 110 passing through the start point S of user operation.

As in the embodiment, when the input unit 110 is provided on a right side of the steering wheel 101, the width WL, WR of the left and right, the left side width WL is wider than the right side width WR.

Figure 5:
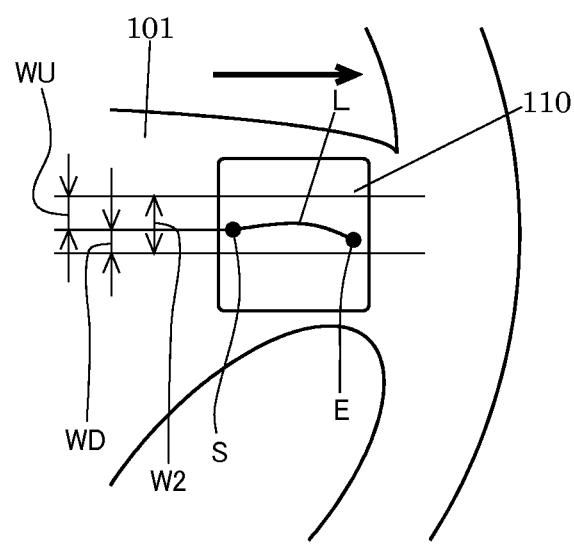
FIG. 5 is an explanatory diagram showing a predetermined width to be recognized as a straight line.

Further, as shown in FIG. 5, in a predetermined width W, a vertical width W2 in a vertical direction of the input unit 110, that is composed of upper and lower side widths WU and WD perpendicular to a horizontal direction of the input unit 110 passing through the start point S of user operation.

In the predetermined vertical width W2, the upper side width WU is larger than the lower side width WD perpendicular to a horizontal direction of the input unit 110 passing through the start point S of user operation.

In step S4, the gesture operation calculated in step S3 is determined. In other words, a feature quantity of the gesture operation is compared with a predetermined gesture operation table data previously recorded on the ROM in the control unit 120. When the feature quantity of the gesture operation is consistent with the gesture operation table data, the process goes to step S5. When the feature quantity of the gesture operation does not consistent with the gesture operation table data, the process goes to step S1.

In step S5, a control signal assigned to the gesture operation detected in step S4 is sent to the device (car navigation device) 130.

For example, as shown in FIG. 2, when a gesture operation of arc-shaped upward flick operation is detected, and the locus L of the arc-shaped gesture operation made by a user finger (thumb) U around a base of the finger does not exceed a predetermined width, the user operation is determined to be a straight line, and a control signal for moving up a display (a menu item or the like) corresponding to the operation quantity of the gesture operation is sent to the device (car navigation device) 130. When the locus L of the gesture operation exceeds the predetermined width, the user operation is not determined to be a straight line, and a control signal corresponding to the operation quantity of the gesture operation is sent to the device (car navigation device) 130.

Further, as shown in FIG. 3, when a gesture operation of arc-shaped downward flick operation is detected, and the locus L of the arc-shaped gesture operation made by a user finger (thumb) U around a base of the finger does not exceed a predetermined width, the user operation is determined to be a straight line, and a control signal for moving down a display (a menu item or the like) corresponding to the operation quantity of the gesture operation is sent to the device (car navigation device) 130. When the locus L of the gesture operation exceeds the predetermined width, the user operation is not determined to be a straight line, and a control signal corresponding to the operation quantity of the gesture operation is sent to the device (car navigation device) 130.

As the input unit 110 is a touch pad, operation is not limited to a flick operation, but may be a slide operation. In the embodiment, determination of slide operation and flick operations is made at a speed of 100 milliseconds before the end point E that the user finger is separated from the input unit 110 and the operation is completed.

The control signal may be assigned to an operation used to control a device (e.g., an air conditioner) used in a vehicle.

In step S4 for detecting the gesture, as the arc-shaped gesture operation is recognized as a straight line, the gesture can be easily input with a finger (thumb) U holding the steering wheel 101, and the device can be safely operated while keeping a driving posture.

Figure 6:
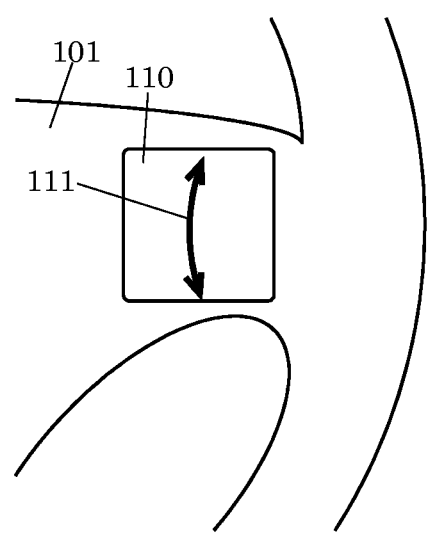
FIG. 6 is a front view of an input unit of the same embodiment.

Further, as shown in FIG. 6, as an arc design 111 indicating the gesture is provided in the input unit 110, the user can easily trace on the design 111 with a finger U holding the steering wheel 101, and can exactly and quickly input a desired gesture operation. This makes the user to concentrate more attention to driving operation.

The arc design 111 is within a predetermined width W. The arc design 111 is provided such that its longitudinal direction is along the vertical direction of the input unit 110.

Further, an arc design is not limited to the arc design 111 extending in the vertical direction of the input unit 110. An arc design may be provided so that its longitudinal direction is along the horizontal direction of the input unit 110. An arc design may be provided so as to cross along the vertical and horizontal directions of the input unit 110.

In the embodiment, the input unit 110 is provided on the right side of the steering wheel 101 held by a user sat on a driving seat of a vehicle. The input unit 110 is not limited to the right side of the steering wheel 101, but may be provided on the left side of the steering wheel 101, or may be provided on both sides of the steering wheel 101.

When the input unit 110 is provided on the left side of the steering wheel 101, in the predetermined lateral width W1, the right side width WR is made wider than the left side width WL with respect to the vertical direction of the input unit 110 passing through the start point S of user operation.

With the above configuration, favorable operation is possible without loosening the steering wheel 101 from the tightly held state the steering wheel 101.

A means for determining a user gesture to be a straight line is not limited to the embodiment. For example, when a rotation radius of a user finger U is 40 mm or more, a user gesture operation may be determined to be a straight line. In the embodiment, for obtaining a rotation radius of the finger U, a center of the rotation radius is previously defined, and the rotation radius is obtained from the distance between the center and the start point S that the user finger U touches the input unit 110.

Further, even if the rotation radius is 40 mm or more, when the rotation radius changes to lower than a certain predetermined value between the start point S of user gesture operation and the end point E as a final contact point, the user operation is not recognized as a straight line, thereby preventing a false recognition. As the final contact point is included in the user operation, when the rotation radius changes to lower than the predetermined value during the user gesture operation, it is not recognized as a straight line.

In the embodiment, the start point S is a position that the user finger U touches the input unit 110. The start point S is not limited to the embodiment, but may be a position of 300 milliseconds just before a final contact point of user operation, for example. By recognizing the start point S as above, even when the user finger U does not quickly move after touching the input unit 110, the user finger U moves on the input unit 110, and the predetermined width or rotation radius is exceeded, the user operation can be recognized as a straight line without failing to recognize or cancel the recognition. With such a configuration, even when the user gets lost in selection after touching the input 110 and then operates, the user operation can be recognized. Though the start point S is a position of 300 milliseconds just before the final contact point of user operation, time before the final contact point may be set to 200 to 400 milliseconds.

INDUSTRIAL APPLICABILITY

The present invention is suitable for a vehicle operation device, which is provided in a steering wheel of a vehicle to operate a device to be installed in a vehicle.

DESCRIPTION OF REFERENCE NUMERALS

100 Vehicle operation device
101 Steering wheel
110 Input unit (Touch pad)
111 Design
120 Control unit
130 Device
E End point
L Locus of gesture operation
S Start point
U Finger (user)
W Width
W1 Width in lateral direction
W2 Width in vertical direction
WD Lower side width
WL Left side width
WR Right side width
WU Upper side width

The invention claimed is:

1. A vehicle operation device comprising an input unit, which is provided on a right side of a steering wheel, and configured to detect a user operation, and a control unit, which determines the user operation detected by the input unit, and outputs a control signal to control a device, wherein
the control unit determines the user operation as a straight line when a locus of the user operation meets a predetermined condition, the predetermined condition is that a locus of the user operation does not exceed a predetermined width, and the predetermined width is such that a left side width is larger than a right side width in a lateral width horizontal to a vertical direction of the input unit passing through a start point of the user operation.

2. The vehicle operation device according to claim 1, wherein
the control unit recognizes the start point as a position of just before a predetermined time from a final contact point of the user operation.

3. A vehicle operation device comprising an input unit, which is provided on a left side of a steering wheel, and configured to detect a user operation, and a control unit, which determines the user operation detected by the input unit, and outputs a control signal to control a device, wherein
   the control unit determines the user operation as a straight line when a locus of the user operation meets a predetermined condition, the predetermined condition is that a locus of the user operation does not exceed a predetermined width, and the predetermined width is such that a right side width is wider than a left side width in a lateral width horizontal to a vertical direction of the input unit passing through a start point of the user operation.

4. A vehicle operation device comprising an input unit, which is provided on a steering wheel, and configured to detect a user operation, and a control unit, which determines the user operation detected by the input unit, and outputs a control signal to control a device, wherein
   the control unit determines the user operation as a straight line when a locus of the user operation meets a predetermined condition, the predetermined condition is that a locus of the user operation does not exceed a predetermined width, and the predetermined width is such that an upper side width is wider than a lower side width in a vertical width perpendicular to a horizontal direction of the input unit passing through a start point of the user operation.

* * * * *

UNITED STATES PATENT AND TRADEMARK OFFICE
CERTIFICATE OF CORRECTION

PATENT NO. : 9,207,856 B2  
APPLICATION NO. : 14/359510  
DATED : December 8, 2015  
INVENTOR(S) : Yuji Imai Page 1 of 1

It is certified that error appears in the above-identified patent and that said Letters Patent is hereby corrected as shown below:

On the title page, item (54) and in the specification, column 1, line 1,

"VEHICULA TOUCH INPUT DEVICE WITH DETERMINATION OF STRAIGHT LINE GESTURE"

should read

--VEHICULAR TOUCH INPUT DEVICE WITH DETERMINATION OF STRAIGHT LINE GESTURE--.

Signed and Sealed this  
Twenty-sixth Day of April, 2016

Michelle K. Lee  
*Director of the United States Patent and Trademark Office*